US005695600A

United States Patent [19]

Goin

[11] Patent Number: 5,695,600

[45] Date of Patent: Dec. 9, 1997

[54] VACUUM TABLE FOR DECAL WEEDING

[76] Inventor: Bobby Gene Goin, 971 Hillside Dr., Louisville, Tenn. 37777

[21] Appl. No.: 664,375

[22] Filed: Jun. 14, 1996

Related U.S. Application Data

[63] Continuation of Ser. No. 317,206, Oct. 3, 1994, abandoned.

[51] Int. Cl.$^6$ ........ B32B 35/00

[52] U.S. Cl. ........ 156/584; 156/248; 156/249; 156/267; 156/344; 428/42.3; 248/363; 269/21

[58] Field of Search ........ 156/344, 584, 156/234, 248, 249, 267; 269/21; 248/362, 363; 118/505; 428/42.3

[56] References Cited

U.S. PATENT DOCUMENTS

| | | | |
|---|---|---|---|
| 2,133,518 | 10/1938 | Huebner | 269/21 X |
| 3,297,508 | 1/1967 | Jahp | 156/249 |
| 3,549,446 | 12/1970 | Bennett et al. | 156/230 |
| 3,631,796 | 1/1972 | Hastings | 101/126 |
| 3,810,812 | 5/1974 | Koenig | 161/1 |
| 3,848,327 | 11/1974 | Gerber et al. | 269/21 X |
| 3,888,725 | 6/1975 | French | 156/556 |
| 4,312,694 | 1/1982 | Sherman | 156/286 |
| 4,547,406 | 10/1985 | Armstrong | 427/282 |
| 4,582,305 | 4/1986 | Brothers | 269/21 X |
| 4,587,873 | 5/1986 | Gerber | 269/21 X |
| 4,675,242 | 6/1987 | Hashimoto et al. | 269/21 X |
| 4,808,046 | 2/1989 | Pilkington et al. | 409/132 |
| 5,141,212 | 8/1992 | Beeding | 269/21 |
| 5,143,576 | 9/1992 | Logan | 156/353 |
| 5,277,736 | 1/1994 | Logan | 156/344 X |

FOREIGN PATENT DOCUMENTS

| | | | |
|---|---|---|---|
| 63-169243 | 7/1988 | Japan | 269/21 |
| 63-312035 | 12/1988 | Japan | 269/21 |
| 2-303744 | 12/1990 | Japan | 269/21 |

*Primary Examiner*—Mark A. Osele
*Attorney, Agent, or Firm*—Luedeka, Neely & Graham PC

[57] ABSTRACT

A vacuum table system for assisting in the weeding of non-desired material from cut decal sheets is disclosed. A vacuum chamber having a perforated top is provided. A porous work surface is provided which communicates a vacuum present in the vacuum chamber to the surface of the work surface. Thus, objects placed on the work surface are held in place by the vacuum. A negative mask, corresponding to the desired portions of the decal, is placed on the work surface and the decal is aligned over the negative mask. The non-desired portions of the decal are drawn to the work surface by the vacuum from the peel-off paper backing while the desirable portions remain separated from the work surface by the negative mask. The decal is then lifted and the non-desired portions separate from the peel-off paper backing because of the vacuum. The desired portions remain on the paper backing due to their separation from the vacuum by the negative mask.

8 Claims, 2 Drawing Sheets

VACUUM TABLE FOR DECAL WEEDING

This is a continuation of application Ser. No. 08/317,206, filed Oct. 3, 1994, now abandoned.

1. Field of the Invention

This invention relates to the field of weeding waste portions of cut decal sheets and particularly, to a vacuum table for holding weed portions of cut decals and allowing the desired portion of the decal to be easily removed and separated from the weed portions.

2. Background of the Invention

Typically, the preparation of the decal is a multi-step process. Initially, the graphic design itself is created on the sheet of material (various types of paper and vinyl materials are used for the graphic design). This step involves the forming, by printing or by a die cut outline or a combination of the two processes, the desired design on a sheet of lamination material. Frequently, depending upon the size of the design or laminating sheet material, several copies of the design will be printed on a single sheet.

The laminating sheet material is then provided with an adhesive layer and a non-stick substrate backing so that the adhesive lightly adheres to the backing and is protected from inadvertent contact with objects. Of course, a completed sheet of decal, adhesive and backing may first be prepared and the designs then printed or die cut thereon.

After the designs are completed, a die then cuts the sheet of laminating material which provides the decal with the desired shape (for example, the letter A might be cut into the sheet if the decal is to include the letter).

The final step, prior to packaging and shipping, is to remove the weed portions of the decal. For example, in a decal of the letter A, the triangular portion in the center top of the A, the open area below the horizontal line and the portions outside the outline of the letter would need to be removed to create a decal which looked like the letter A.

Traditionally, this weeding process is carried out by hand. However, this is a time consuming and labor intensive process. In a complex decal design, there may be 100 or more weed portions to be removed, some being very small or delicate.

Therefore, it is an object of the present invention to provide a system for the rapid weeding of decals.

It is a further object of the present invention to provide a vacuum table system for weeding decals.

It is yet a further object of the present invention to provide a vacuum table system for weeding decals in which weed portions of decals are drawn to a work surface of a vacuum table while non-weed or "keeper" portions of the decal are protected from the vacuum by a negative mask.

SUMMARY OF THE INVENTION

The above and further objects are met in a preferred embodiment of the present invention which provides a vacuum table system for use in rapid weeding of cut decal sheets.

In the preferred embodiment, a vacuum chamber defining an enclosure about a partially evacuated volume having a vacuum discharge conduit and a top is provided. A perforated support sheet is provided as the structural top of the vacuum chamber so that the vacuum may be communicated from the interior of the chamber through the perforations to the top surface of the chamber. A porous work surface is provided over the support sheet and preferably has a pore size of less than about 1 mm and at least about 15.5 to 23.25 pores per $cm^2$ (100 to 150 pores per square inch). The vacuum which is communicated from the vacuum chamber through the perforations in the support sheet is likewise communicated through the pores in the work surface to the top of the work surface which tends to draw objects down towards the work surface. A selectively operable vacuum pump is connected to the vacuum chamber with a conduit to enable the selective variation of the air pressure within the vacuum chamber relative to the air pressure outside of the vacuum chamber. The porous work surface communicates any air pressure differential between the vacuum chamber and the outside pressure to the work surface. A negative mask is provided on the work surface corresponding to non-weed or "keeper" portions of the decal. When a die cut decal blank is positioned on the work surface in alignment with the negative mask and the vacuum chamber evacuated, portions of the laminated sheet material to be weeded from the decal are drawn to the work surface by virtue of the vacuum communicated through the pores of the work surface. However, since a negative mask is interposed between the work surface and the non-weed portions of the decal, these keeper portions are not drawn to the work surface. Thus, when the decal is lifted from the vacuum table, the weed portions remain held to the work surface by the vacuum while the non-weed portions are removed with the rest of the decal support substrate since no vacuum is drawing them to the work surface.

In a further preferred embodiment of the present invention, a border mask is provided around the edges of the work surface which are not used in the weeding of a decal so as to intensify the vacuum differential over other portions of the work surface.

In a further preferred embodiment, the selectively operable vacuum pump is reversible so as to provide either a negative pressure differential in the vacuum chamber with respect to outside air pressure or a positive pressure differential within the vacuum chamber with respect to outside air pressure. Thus, enabling an operator of the air table system to alternatively draw things to the work surface by providing a negative air pressure differential within the vacuum chamber or blow items away from the surface by providing a positive air pressure differential within the vacuum chamber.

BRIEF DESCRIPTION OF THE DRAWINGS

The above and further features of a preferred embodiment of the present invention may best be understood with reference to the following Detailed Description of the Preferred Embodiment in the drawings in which.

DETAILED DESCRIPTION OF THE PREFERRED EMBODIMENT

Figure 1:
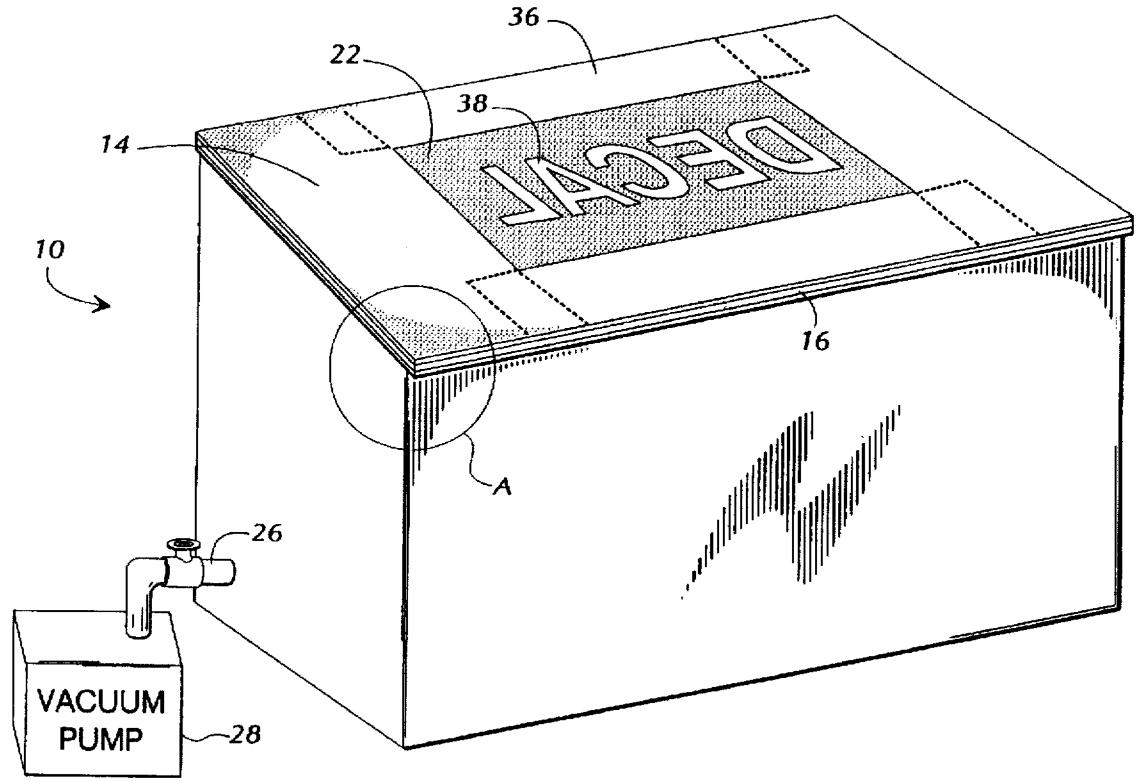
FIG. 1 is a perspective view of a vacuum table system masked for weeding detail.
Figure 2:
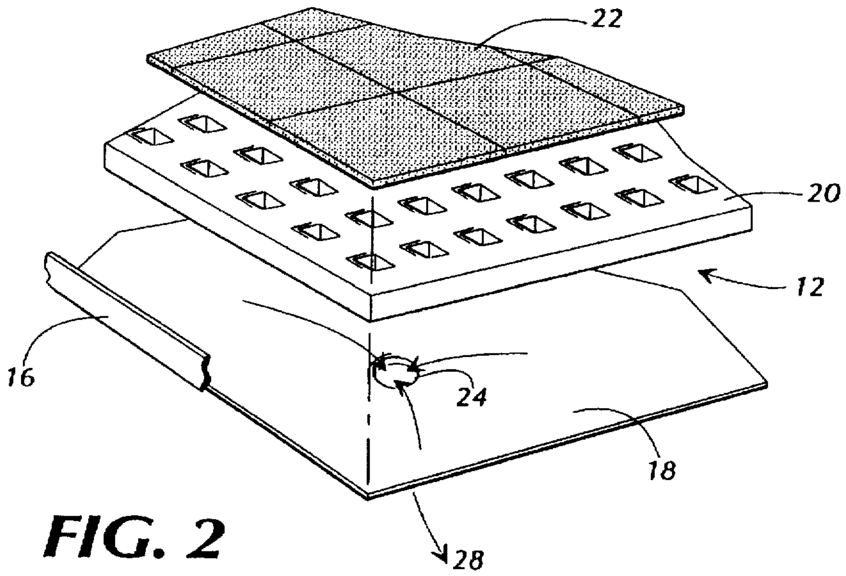
FIG. 2 is an exploded view of a portion of a vacuum table system taken in the region of FIG. 1, detail A; and, FIG. 3 is a perspective view of the FIG. 1 vacuum table showing a decal partially weeded.

Referring now to the figures in which like reference numerals indicate like or corresponding features, there is shown in FIGS. 1 and 2 a vacuum table system 10 made in accordance with preferred embodiment of the present invention.

The vacuum table system 10 consists of a vacuum chamber 12 whose top surface 14 provides a work surface for the weeding of decals. Referring now to FIG. 2, a description of the construction of the vacuum chamber 12 and work surface 22 may be provided in greater detail. The vacuum chamber 12 consists of a steel section having sidewalls 16 and a bottom 18. The sidewalls 16 are attached to the bottom 18 so as to provide an airtight arrangement. Preferably, the sidewalls are between one to two inches high so as to minimize the volume of the vacuum chamber 12 and, thereby, the amount of air that would need to be removed. The top of the vacuum chamber is provided by a perforated steel plate 20 to provide structural rigidity to the top surface of the vacuum chamber 12. Preferably, the perforated steel plate 20 has a perforation size of about 0.634 cm (¼ inch) to about 1.27 cm (½ inch) diameter distributed about 387 to about 1549 perforations per $m^2$ 36 to 144 perforations per sq. ft.). The final portion of the vacuum chamber 12 is the work surface 22. The work surface 22 is preferably constructed from a porous metal or ceramic material having a very fine porosity. For example, Astro Met, Inc. of Cincinnati, Ohio, manufactures a variety of ceramic and metal porous materials which would serve the purpose. Typically, a preferred material would be a metal foam having a porosity within the range of about 15% to about 95%. Pore distribution is between about 1.97 pores per cm (5 pores per lineal inch) to about 39.37 pores per cm (100 pores per lineal inch). Such metal foams are typically not available in large sheet sizes which would cover the entire work surface of the vacuum table system 10; therefore, a series of precisely cut porous metal tiles may be used to construct the work surface 22. Such metal foams may be cobalt alloys, copper and copper alloys (brass and bronze), gold, iron, molybdenum, nickel, nickel alloys, platinum, rhenium, rhodium, silver, stainless steel, tantalum, titanium, and tungsten. However, the less expensive metal foams are preferred in the present invention such as copper alloys, stainless steel, nickel alloys and iron. As will be discussed further hereinafter, the very fine porosity is necessary to allow for weeding of highly detailed decals.

Figure 4:
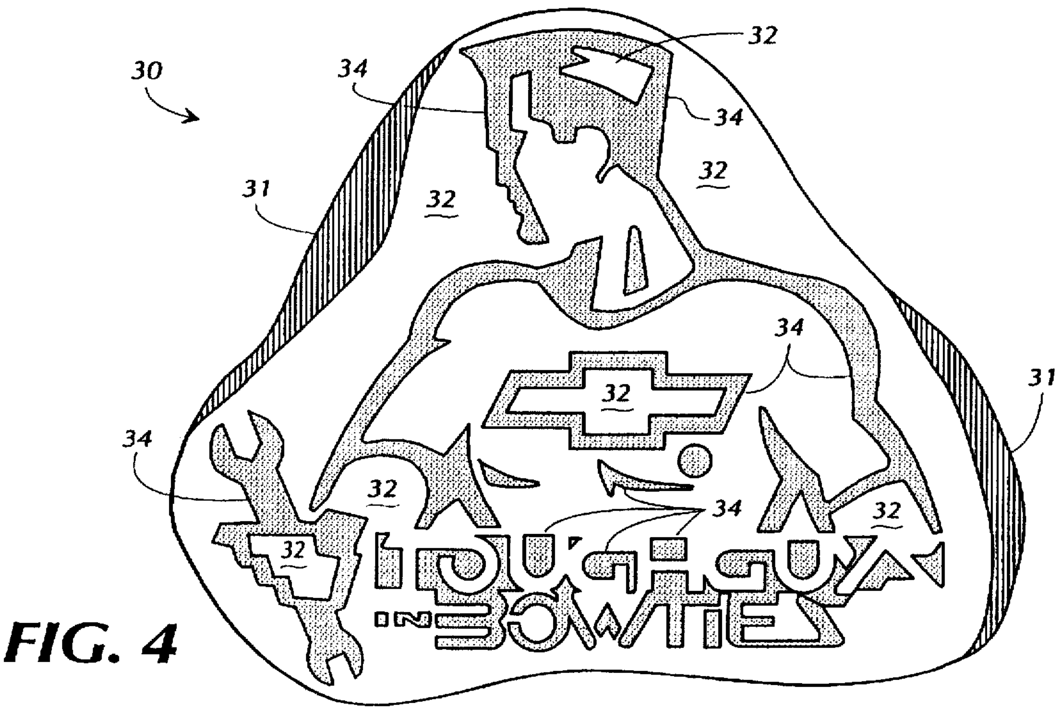
FIG. 4 is a drawing showing a decal which would be weeded using the device of FIG. 1.

Referring now to FIG. 4, a brief description of the weeding process may be described. There is shown in FIG. 4, a die cut decal 30. The outlines indicate the contours of the die cuts on the decal 30. Typically, a graphic sheet of the lamination material supports printed graphics and bears the die cut outline. An adhesive layer applied to the lamination material lightly adheres the lamination material sheet to a peel-off, non-stick paper substrate 31. The decal blank 30 at this point, consists of both weed portions 32 and keeper or non-weed portions 34.

Traditionally, the weeding of the decal 30 has been done by hand. This entails lifting off all of the weed portions 32 by hand. As one can well imagine, especially in a decal with a lot of detail such as that shown in FIG. 4, the hand weeding of the decal is a very time consuming and tedious process. Thus, while all of the other steps may be completed by automated machinery, the hand weeding of the decals slows the process down greatly and greatly reduces production capacity. Additionally, since it is so labor intensive, the hand weeding of decals increases labor costs substantially. Such costs are increased particularly where enough people are engaged to weed the decals as fast as the automated machinery can produce them.

Figure 3:
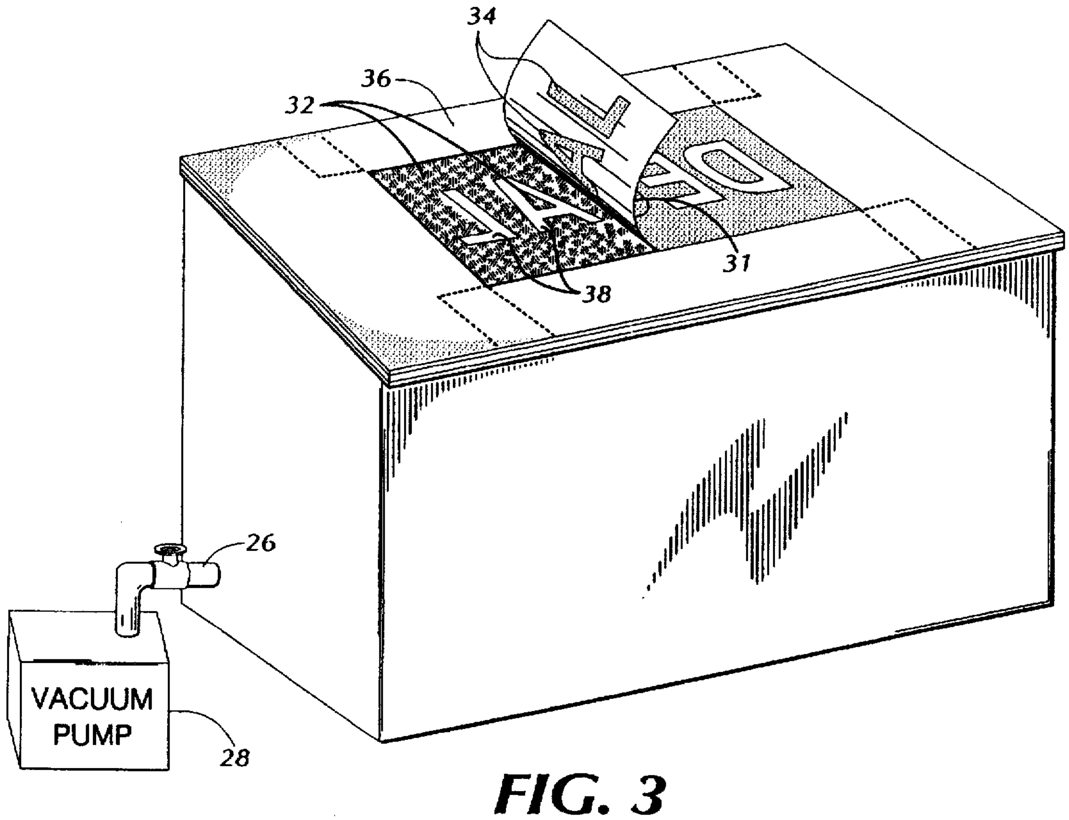

As is shown in FIG. 2, a vacuum inlet 24 is provided into the vacuum chamber 12. A vacuum conduit 26 is provided between the vacuum inlet 24 and the vacuum pump 28. Thus, the vacuum pump can be operated and a vacuum drawn on vacuum chamber 12. The vacuum in vacuum chamber 12, will be provided to the work surface 22 through the pores in the work surface 22 and the perforations in the support plate 20. With respect to FIGS. 1 and 3, masking 36 is provided around the edges of the work surface 22 which will not be used for weeding a decal. This masking 36 protects the worker's arms or loose objects from being sucked onto the vacuum table work surface 22. A negative mask 38 is provided on the work surface 22 and is held to the work surface 22 by a releasable adhesive. This negative mask 38 corresponds to the keeper portions 34 of the decal 30 shown in FIG. 4.

In use, the mask 36 and the negative mask 38 would be placed on the work surface 22 and secured in place. The decal blank, having both weed and non-weed portions in place but separated by die cuts, is placed upon the work surface in alignment with the negative mask. A vacuum is now drawn within vacuum chamber 12, and transmitted to the surface of work surface 22 which tends to draw any object placed on the work surface 22 down towards the work surface 22. To complete the weeding process, all that is necessary is that one corner of the decal 30 be lifted and the decal peeled off of the work surface 22. The weed portions 32 would remain held by the vacuum transmitted through the work surface 22 while the non-weed portions 34 would remain adhered to the non-stick paper 31 because of the interposition of the negative mask 38 between the work surface 22 and the keeper portions of the decal.

Disposal of the weed portion 32 held by the vacuum on the work surface 22 could be accomplished in several ways. First, the vacuum pump 28 could be reversed so as to pump air into the vacuum chamber 12 which would create a positive pressure differential between the vacuum chamber 12 and the outside air. Thus, air would be blown from the work surface 22 and the weed portions 34 could be blown off of the vacuum table system 10. Also, the vacuum pump 28 could merely be turned off and the weed portions brushed off of the work surface 22.

Furthermore, this process could easily be automated wherein a conveyor system brought the unweeded decal over the work surface 22, the vacuum pump 28 was turned on, another assembly grabbed the keeper portion of the decal and peeled it away from the work surface 22, the vacuum pump 28 was turned off, and the weed portions were brushed away from the work surface 22.

In the preferred embodiment, a variable vacuum of at least about 5 inches of water column to about 0.211 kg/cm$^2$ gauge or 0.823 kg/cm$^2$ absolute (−3 psig or 11.7 psia) should be provided in order to properly hold the weed portions to the work surface 22. Also, preferred is a stainless steel metal foam having a porosity of approximately 50% and a pore size of approximately 5 micron to about 1 mm as to the work surface 22. The dimensions of a typical vacuum chamber would be approximately 91.44 cm (36") long×76.2 cm (30") wide)×5.08 (2") deep. Thus, the perforated steel support structure would be 91.44 cm (36")×76.2 cm (30") as would the completed work surface 22. A suitable vacuum pump would be one such as the E2MS made by Edwards Hi-Vac International.

The foregoing detailed description of a preferred embodiment is for the purpose of illustration and not limitation. The preferred embodiment is capable of numerous substitutions, modifications and deletion without departing from the scope of the claims as set forth herein.

As my invention, therefore, I claim:

1. A vacuum table system for use in the rapid weeding of cut decal sheets comprising:

a vacuum chamber defining an enclosure about a partially evacuated volume having a top support structure;

a perforated support plate disposed across said top support structure, a partial vacuum being communicated from said vacuum chamber through said perforations in said support plate;

a porous work surface provided over said perforated support plate;

a selectively operable atmosphere evacuation means connected to said vacuum chamber to selectively reduce the pressure of atmosphere within said vacuum chamber relative to the pressure of atmosphere outside of said vacuum chamber;

said porous work surface transmitting an air flow from said atmosphere outside of said vacuum chamber into said atmosphere within said vacuum chamber whereby objects placed on said work surface are drawn to said work surface;

a decal comprising weed and non-weed portions of a die cut sheet lightly adhered to a supporting substrate, said weed and non-weed portions having distinctive size, shape and relative positionment on said substrate; and, negative mask means corresponding to the size and shape of non-weed portions of said decal secured to said work surface in relative positional correspondence with said decal non-weed portions, said decal being positioned on said work surface and over said negative mask means with said decal non-weed portions aligned with said negative mask means whereby the presence of at least a partial vacuum in said vacuum chamber will separate said weed portions from said decal when said supporting substrate is removed from said work surface.

2. The system of claim 1 wherein said perforated support plate is stainless steel having perforations of about 0.635 cm (¼ inch) to about 1.27 cm (½ inch) diameter provided therein distributed at about 387 to about 1549 perforations per $m^2$ (36 to about 144 perforations per $ft^2$).

3. The system of claim 1 wherein said porous work surface is a metal foam having a pore size between about 5 microns and about 1 mm, and a porosity between about 15% and about 95%.

4. The system of claim 1 wherein said selectively operable atmosphere evacuation means is a reversible pump for selectively increasing or decreasing air pressure within said vacuum chamber relative to ambient air pressure.

5. The system of claim 1 wherein said vacuum exerts a downward pressure on objects placed on said work surface corresponding to at least about 12.7 cm (five inches) of water column.

6. A vacuum table system for use in the rapid weeding of cut decal sheets comprising:

a vacuum chamber defining an enclosure about a partially evacuated volume having a top side;

a support sheet having perforations provided therein, said perforations having a diameter size of about 0.635 cm (¼ inch) to about 1.27 cm (½ inch) and numbering about 387 to about 1549 per $m^2$ (36 to about 144 per $ft^2$), provided as structure for said top side of said vacuum chamber, a partial vacuum being communicated from said vacuum chamber through said support sheet perforations;

a porous work surface provided over said perforated support sheet, said porous work surface having a pore size of between about 5 microns and 1 mm and having a porosity of between about 15% and 95%;

a selectively operable vacuum pump means connected to said vacuum chamber to selectively draw a partial pressure in said vacuum chamber relative to the air pressure outside of said vacuum chamber;

said porous work surface transmitting air flow from outside said vacuum chamber into said vacuum chamber when said vacuum chamber has a lower air pressure relative to said outside air pressure and objects placed on said work surface are drawn to said work surface;

a decal comprising weed and non-weed potations of a die cut sheet lightly adhered to a supporting substrate, said weed and non-weed portions having distinctive size, shape and relative positionment on said substrate; and, negative mask means corresponding to the size and shape of non-weed portions of said decal secured to said porous work surface in relative positional correspondence with said decal non-weed portions, said decal being positioned on said work surface and over said negative mask means with said decal non-weed portions aligned with said negative mask means whereby removal of said decal from said work surface with a vacuum in said chamber separates said decal weed portions from said substrate.

7. The system of claim 6 wherein said selectively operable vacuum pump means is a reversible pump for selectively increasing or decreasing the air pressure within said vacuum chamber relative to ambient air pressure.

8. The system of claim 6 wherein said vacuum exerts a downward pressure on objects placed on said work surface corresponding to at least about 12.7 cm (five inches) of water column.

* * * * *

UNITED STATES PATENT AND TRADEMARK OFFICE
CERTIFICATE OF CORRECTION

PATENT NO. : 5,695,600
DATED : December 9, 1997
INVENTOR(S) : Bobby Gene Goin

It is certified that error appears in the above-identified patent and that said Letters Patent is hereby corrected as shown below:

Column 4, line 44, the value "0.211" is negative, (-).

Column 6, line 26 (Claim 6), following "non-weed", correct the spelling of --portions--.

Signed and Sealed this

Thirty-first Day of March, 1998

Attest:

Bruce Lehman

BRUCE LEHMAN

*Attesting Officer*

*Commissioner of Patents and Trademarks*